United States Patent
O'Callaghan (10) Patent No.: US 9,609,372 B2
(45) Date of Patent: Mar. 28, 2017

(54) PROGRAM SUPPORT SERVICE BASED ON SECONDARY NETWORK AND CONNECTION

(71) Applicant: Verizon Patent and Licensing Inc., Basking Ridge, NJ (US)

(72) Inventor: Daniel J. O'Callaghan, Fairfax Station, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 109 days.

(21) Appl. No.: 14/136,043

(22) Filed: Dec. 20, 2013

(65) Prior Publication Data

US 2015/0181307 A1   Jun. 25, 2015

(51) Int. Cl.
| | |
|---|---|
| *H04N 21/462* | (2011.01) |
| *H04N 21/239* | (2011.01) |
| *H04N 21/647* | (2011.01) |
| *H04N 21/472* | (2011.01) |
| *H04N 21/437* | (2011.01) |

(52) U.S. Cl.
CPC ....... *H04N 21/2393* (2013.01); *H04N 21/437* (2013.01); *H04N 21/4622* (2013.01); *H04N 21/472* (2013.01); *H04N 21/64776* (2013.01)

(58) Field of Classification Search
CPC ............ H04N 21/2393; H04N 21/437; H04N 21/4622; H04N 21/472; H04N 21/482; H04N 21/6131; H04N 21/6181; H04N 21/6375; H04N 21/64322; H04N 21/64776; H04N 21/222; H04N 21/235; H04N 21/237; H04N 21/242
See application file for complete search history.

(56) References Cited

U.S. PATENT DOCUMENTS

| | | | |
|---|---|---|---|
| 2008/0137548 A1* | 6/2008 | Hassan et al. | 370/252 |
| 2009/0070848 A1* | 3/2009 | Kim | H04N 21/414 725/131 |
| 2009/0119701 A1* | 5/2009 | Aldrey | H04N 21/4622 725/32 |
| 2009/0220216 A1* | 9/2009 | Marsh | H04N 21/47214 386/292 |
| 2010/0014666 A1* | 1/2010 | Park | H04N 21/23432 380/210 |
| 2010/0153985 A1* | 6/2010 | Dey | 725/25 |
| 2010/0241845 A1* | 9/2010 | Alonso | H04N 21/2347 713/150 |

(Continued)

*Primary Examiner* — Pankaj Kumar
*Assistant Examiner* — Alexander Boyd (57) ABSTRACT

A method, a device, and a non-transitory storage medium having instructions to establish a first connection via a first network that provides access to a program service; obtain program support service data that indicates a program support service including at least one of a retransmission service, an error correction service, or a scalable program service; determine whether to invoke the program support service based on the program support service data; establish a second connection via a second network that provides access to the program support service in response to a determination to invoke the program support service; invoke the program support service via the second connection; receive program data of a program via the first connection; and receive program support data pertaining to the program via the second connection.

20 Claims, 8 Drawing Sheets

(56) References Cited

U.S. PATENT DOCUMENTS

| | | | |
|---|---|---|---|
| 2012/0257492 A1* | 10/2012 | Henry et al. .................. | 370/216 |
| 2013/0060911 A1* | 3/2013 | Nagaraj ........... | H04N 21/23432 |
| | | | 709/219 |
| 2013/0254611 A1* | 9/2013 | Amerga et al. ............... | 714/746 |
| 2013/0346566 A1* | 12/2013 | Kwon ................ | H04N 21/4622 |
| | | | 709/219 |
| 2014/0196093 A1* | 7/2014 | Kotecha et al. ................ | 725/54 |
| 2015/0012933 A1* | 1/2015 | Fay .................. | H04N 21/23605 |
| | | | 725/27 |

* cited by examiner

PROGRAM SUPPORT SERVICE BASED ON SECONDARY NETWORK AND CONNECTION

BACKGROUND

A content delivery network (CDN) (also known as a content distribution network) may deliver programs to users using various methods, such as streaming, downloading, broadcasting, multicasting, unicasting, etc. The content delivery network stores the programs and services requests for the programs.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A television service provider may offer and deliver programs to users. Unfortunately, a network via which the programs are delivered can become congested and cause program delivery failures and/or a user device can receive program data with errors. In the communication arts, there are various methods and techniques that address this issue, namely in the way of retransmission. For example, the Transmission Control Protocol (TCP) includes a retransmission service. Additionally, errors can be corrected using various forward error correction (FEC) schemes.

While the above approaches address delivery failures and errors, such approaches suffer from a common disadvantage in that retransmissions and FEC data are transmitted via the same physical connection and the same network as the original delivery of program data. As an example, a server in a congested network delivers a program to a user device. Due to the congestion, the user device requests retransmission of some packets. The server retransmits these packets via the same physical connection and congested network that the original packets were transmitted, and in turn causes further congestion in the network.

As user device capabilities expand to support multiple connections via multiple networks, the availability of these resources can be used to improve the delivery of programs or other forms of data.

According to exemplary embodiments, an environment includes a first network device, a first network, a second network device, a second network, and a user device capable of simultaneously connecting to the first network device via the first network and the second network device via the second network. According to an exemplary embodiment, a first network device provides a program service. According to an exemplary embodiment, a second network device provides a program support service. According to an exemplary embodiment, the program support service includes a retransmission service. According to another exemplary embodiment, the program support service includes an FEC service. According to yet another exemplary embodiment, the program support service includes a scalable program service. According to an exemplary use case, assume a smartphone has WiFi and Long Term Evolution (LTE) communicative capabilities/interfaces. A user of the smartphone invokes a program service with the first server via the WiFi network. The user selects, via the smartphone, a program hosted on the first server. During a handshaking process to establish a first connection, the smartphone receives data indicating that a retransmission service is available and details allowing the smartphone to use the retransmission service. For example, the smartphone receives data including a network address (e.g., a Uniform Resource Identifier (URI)) of a second server, which provides the retransmission service and is accessible via an LTE network. The smartphone establishes a second connection with the second server. During the transmission of the program via the first connection, the smartphone detects some missing packets. The smartphone requests, via the second connection and to the second server, the retransmission of the missing packets. The second server transmits a response that includes the missing packets to the smartphone.

Figure 1:
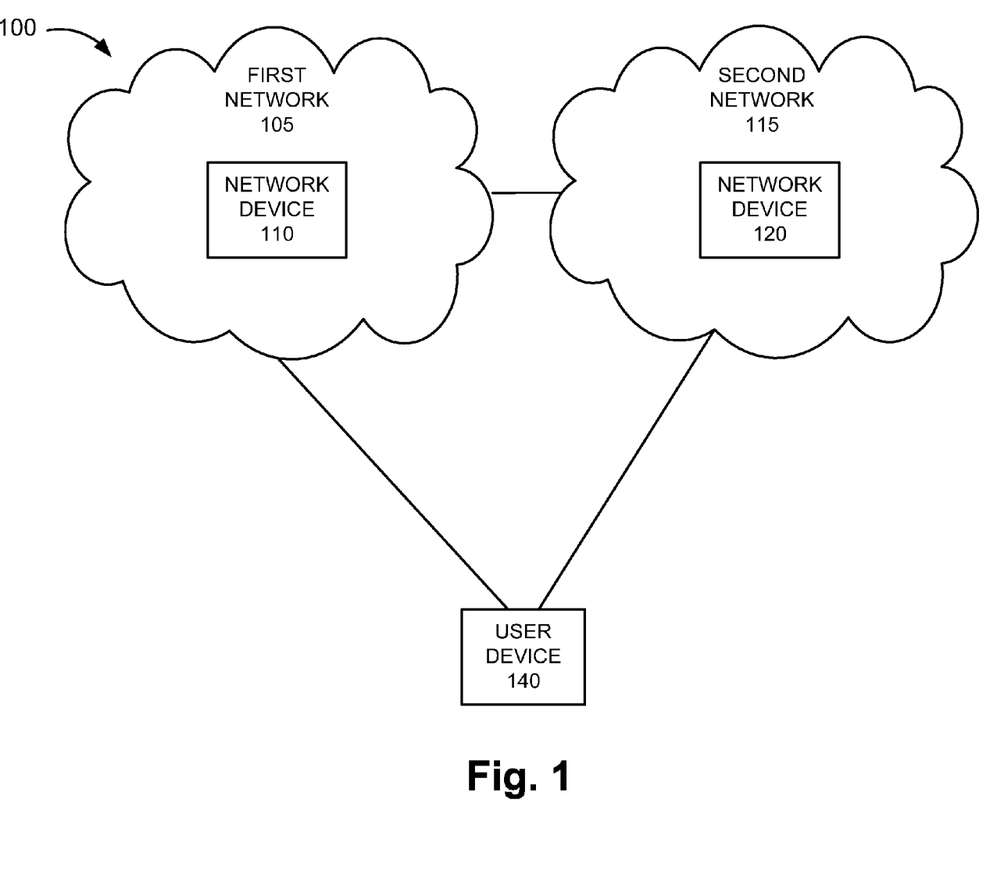
FIG. 1 is a diagram illustrating an exemplary environment in which exemplary embodiments may be implemented.

FIG. 1 is a diagram illustrating an exemplary environment 100 in which exemplary embodiments may be implemented. As illustrated, environment 100 includes a first network 105. First network 105 includes a network device 110. Environment 100 also includes a second network 115. Second network 115 includes a network device 120. As further illustrated, environment 100 includes a user device 140.

Environment 100 may be implemented to include wired, optical, and/or wireless connections among the devices and the networks illustrated. A connection may be direct or indirect and may involve an intermediary device and/or an intermediary network not illustrated in FIG. 1. Additionally, the number and the arrangement of connections between the devices and the networks of environment 100 are exemplary.

The number of devices and networks, and the configuration in environment 100 are exemplary. According to other embodiments, environment 100 may include additional devices, different devices, and/or differently arranged devices, than those illustrated in FIG. 1. For example, a single device in FIG. 1 may be implemented as multiple devices. By way of further example, network device 110 and network device 120 may be implemented as a single network device that provides both the program service and the program support service. For example, the single network device may be implemented to include a single network interface that uses separate ports for each service or include separate and/or dedicated network interfaces for each service. Additionally, or alternatively, environment 100 may include an additional network and/or a differently arranged network, than that illustrated in FIG. 1. For example, the program service and the program support service may be co-resident in a same network. However, the user's access to the program service is via one network and the user's access to the program support service is via a different network.

A device (e.g., network device 110, network device 120, and user device 140) may be implemented according to one or multiple network architectures (e.g., a client device, a server device, a peer device, a proxy device, and/or a cloud device). A device may be implemented according to a centralized computing architecture, a distributed computing architecture, or a cloud computing architecture. Also, according to other embodiments, one or more functions and/or processes described as being performed by a particular device may be performed by a different device, or some combination of devices.

First network 105 and second network 115 may share a common service provider. Alternatively, first network 105 and second network 115 may each be associated with different service providers.

First network 105 includes a network that provides access to a program service. For example, first network 105 may be a television distribution network or a video on-demand network. First network 105 may be implemented using various technologies and/or architectures, such as an optical architecture, a coaxial cable architecture, an Internet Protocol (IP) TV architecture, a wireless architecture, or a digital subscriber line (DSL) architecture. First network 105 may be implemented as a satellite-based network, a terrestrial-based network, or a combination thereof.

Depending on the architecture implemented and the specific type of program service (e.g., linear television, on-demand program service), first network 105 may include various types of network devices that contribute to the access/use of the program service. Network device 110 includes a network device that provides the program service. For example, network device 110 may include a program server device from which user device 140 receives a program. Although not illustrated, first network 105 may include various program distribution devices, program storage devices, program guide devices, and other types of devices that contribute to the program service, such as, billing devices, security devices, and customer profile devices. By way of further example, first network 105 may include super headend (SHE) devices, video hub office (VHO) devices, video serving office (VSO) devices, routers, gateway devices, program server devices, interactive programming guide devices, load balancer devices, optical network termination (ONT) devices, switching devices, splitter devices, passive optical network (PON) devices, video on-demand servers, etc.

Second network 115 includes a network that provides access to a program support service. For example, second network 115 provides access to a retransmission service, an error correction service, and/or scalable program service. Second network 115 may be implemented using various technologies and/or architectures, such as an optical architecture, a coaxial cable architecture, an Internet Protocol (IP) TV architecture, a wireless architecture, or a digital subscriber line (DSL) architecture. Second network 115 may be implemented as a satellite-based network, a terrestrial-based network, or a combination thereof.

According to an exemplary embodiment, second network 115 provides access to a retransmission service. For example, second network 115 retransmits program data to user device 140. According to another exemplary embodiment, second network 115 provides an error correction service. For example, second network 115 transmits error correcting data to user device 140. According to yet another exemplary embodiment, second network 115 provides a scalable program service. For example, second network 115 transmits a layer of a scalable video pertaining to a program that enhances the resolution of a base layer of the scalable video of the program transmitted by first network 105.

Depending on the architecture implemented and the specific embodiment of the program support service (e.g., the retransmission service, the error correction service, and/or the scalable program service), second network 115 may include various types of network devices that contribute to the access/use of the program support service. Network device 120 includes a network device that provides the program support service. For example, network device 120 may be implemented to include a program server device from which user device 140 receives retransmission data, error correction data, or scalable program data. For example, network device 120 retransmits program data (i.e., retransmission data) to user device when providing the retransmission service. Additionally, for example, network device 120 transmits error correcting data to user device 140 when providing the error correction service. Additionally, for example, network device 120 transmits a layer of scalable program data to user device 140 when providing the scalable program service. By way of further example, the scalable program data pertains to a program that enhances the resolution of a base layer of scalable video transmitted from network device 110. The program support service may be implemented on a per-channel, per-stream, or a per-program basis. For example, the program support service provider may wish to only provide the program support service for main channels, certain types of programs, etc.

Although not illustrated, second network 115 may include various data distribution devices. By way of example, second network 115 includes a wireless network, which may be implemented according to various wireless technologies and/or architectures, such as a cellular network, a non-cellular network, a $3^{rd}$ Generation (3G) network, a $4^{th}$ Generation (4G) network, etc. By way of further example, second network 115 may be implemented to include an LTE network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Evolution Data Optimized (EV-DO) network, and/or another type of wireless network (e.g., an LTE Advanced network, or future generation wireless network architecture).

User device 140 includes an end user device that allows a user to digest (e.g., play, display, etc.) a program. User device 140 may be implemented to include a smartphone, a tablet device, a netbook, a vehicular communication system within a vehicle (e.g., a car, a truck, etc.), a computer, a smart television, a set top box, or some other type of suitable wireless communicative device. According to an exemplary embodiment, user device 140 is capable of connecting to network device 110 via first network 105 and network device 120 via second network 115. For example, user device 140 includes multiple communication interfaces. The communication interfaces may operate according to distinct communication standards (e.g., wired and wireless).

According to an exemplary embodiment, user device 140 includes an agent or a client (referred to herein as simply an "agent") that supports the program service and the program support service, as described herein. For example, the agent includes logic to invoke and use the program support service (e.g., the retransmission service, the error correction service, and/or the scalable program service). According to an exemplary embodiment, the agent identifies that user device 140 includes multiple communication interfaces. According to an exemplary implementation, the agent identifies this during boot-up, when the program support service is determined to be available to the user, or this information may be stored at user device 140. According to an exemplary embodiment, the agent selects which communication interface to use to receive each service. According to an exemplary implementation, the agent determines the capacity of each communication interface. For example, the agent may ping network device 110 and/or network device 120 to ascertain if the program service and/or the program support service is reachable via a communication interface. Additionally, the agent may measure other communication parameters (e.g., propagation time, round-trip time, etc.). The agent may also determine the bandwidth available and/or other capacity-related/quality-of-service (Qos) metrics. In this way, the agent may select the communication interface that yields, for example, the higher capacity link to receive the program service and another communication interface that yields a lesser (or possibly equal) capacity link to receive the program support service. For example, a WiFi communication interface may provide a higher bandwidth capacity and communication link to a program device compared to an LTE communication interface. According to this example, the agent selects the WiFi communication interface to support the program service and the LTE communication interface to support the program support service. User device 140 may store configuration data or a command line option (e.g., program service —X_NIC and program support service—Y_NIC) that indicates the capability of a communication interface and/or the communication interface to use for a given service.

According to an exemplary embodiment, the agent may not invoke the program support service even when the program support service is available and user device 140 is able to invoke/use the program support service. For example, the agent may omit to invoke/use the program support service based on user preference data indicating not to use the program support service. Alternatively, the agent may omit to use the program support service based on the characteristics of the communication link to network device 110 (e.g. the program device that provides the program service). As an example, the agent may determine that the communication link yields substantially small, if any, occurrences of errors. For example, the agent may determine, based on historical data, that an optical connection to a program server yields relatively no errors when receiving program data. Also, assume the program support service includes the error correction service and/or the retransmission service. The agent may opt to not invoke/use the error correction service and/or the retransmission service in view of the extremely low probability of errors to occur via the connection that receives the program. In the event the agent subsequently determines that the program support service is needed, the agent may invoke/use the program support service.

According to an exemplary embodiment, the agent provides a user interface to allow a user to set user preferences. For example, a user may be able to turn on or turn of the use of a program support service. According to an exemplary embodiment, the agent obtains program support service data to invoke/use the program. According to an exemplary implementation, the agent obtains the program support service data (e.g., from another device) in response to selecting a channel or a program that offers the service, as described further below. Alternatively, according to another exemplary implementation, the agent obtains the program support service data at another time, etc. For example, a user may go through an on-boarding process to invoke or use the program support service. Thereafter, the program support service data is stored and managed by the agent of user device 140. The agent may be implemented in various ways. For example, the agent may be implemented as a plugin for a web browser, a media player, or some other type of client. Alternatively, the agent may be implemented as a standalone application or an embedded application (e.g., an application bundled with user device 140, etc.).

Figure 2A:
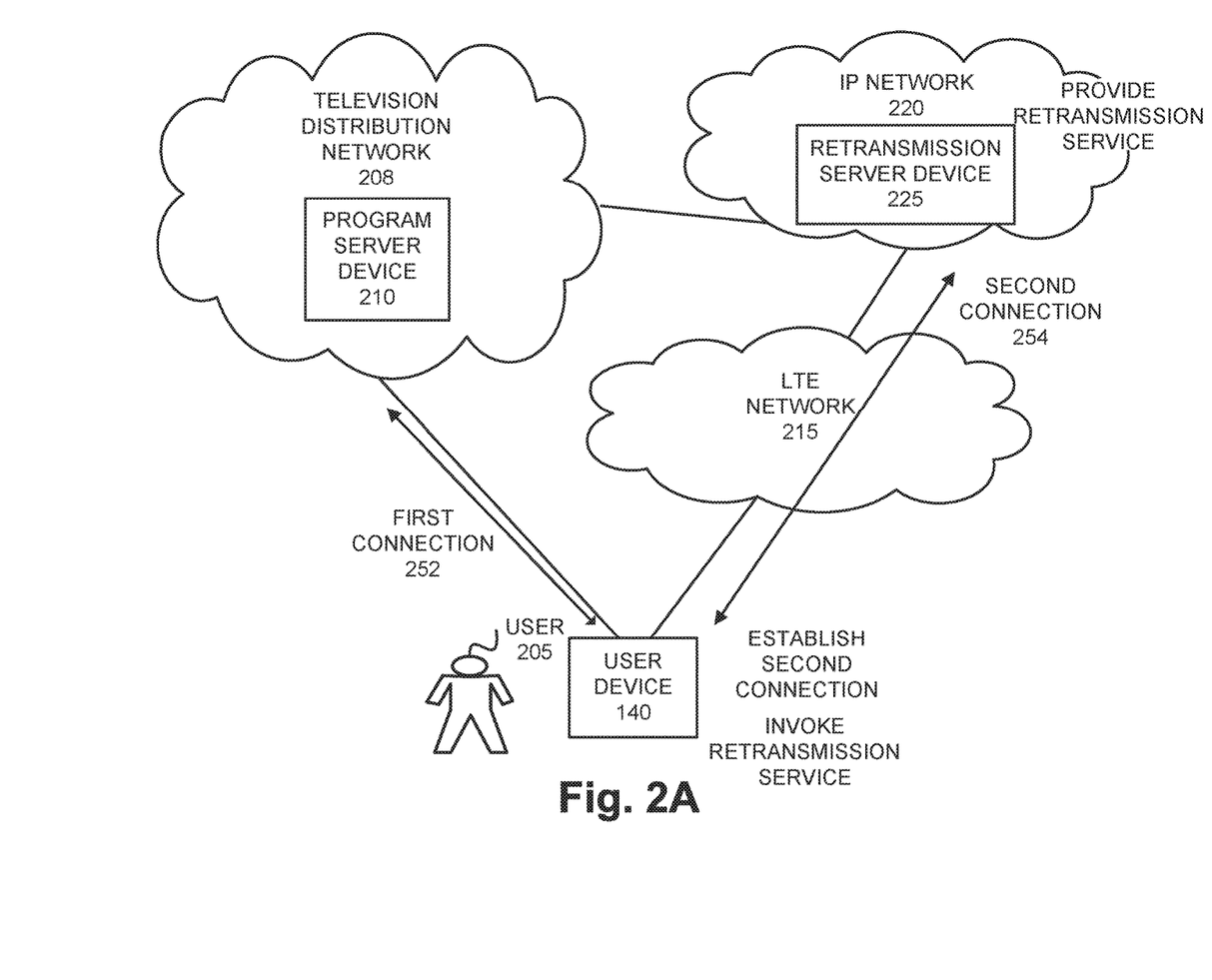
FIGS. 2A-2C are diagrams that illustrate exemplary processes pertaining to the program support service based on a secondary network and connection.
Figure 2B:
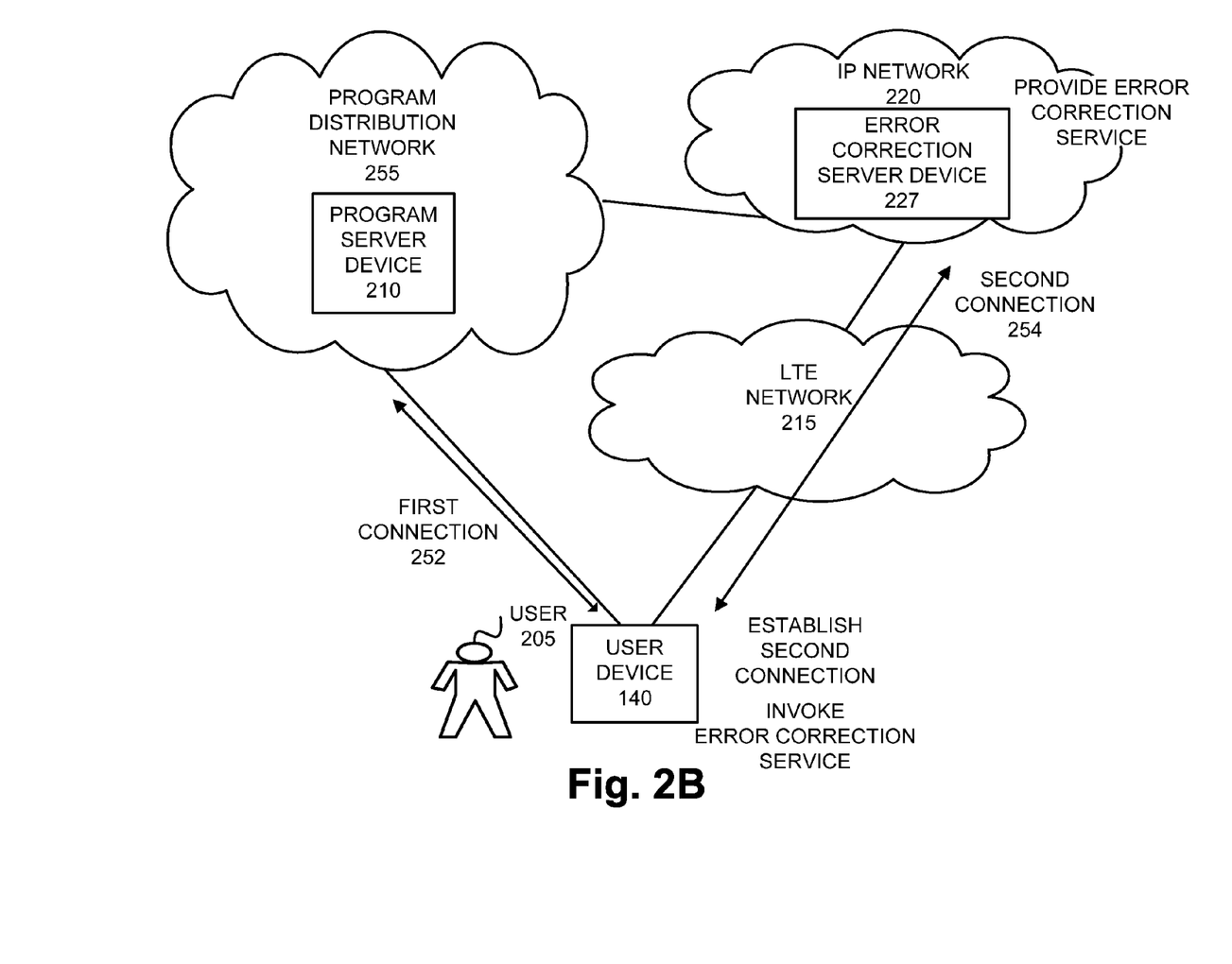
Figure 2C:
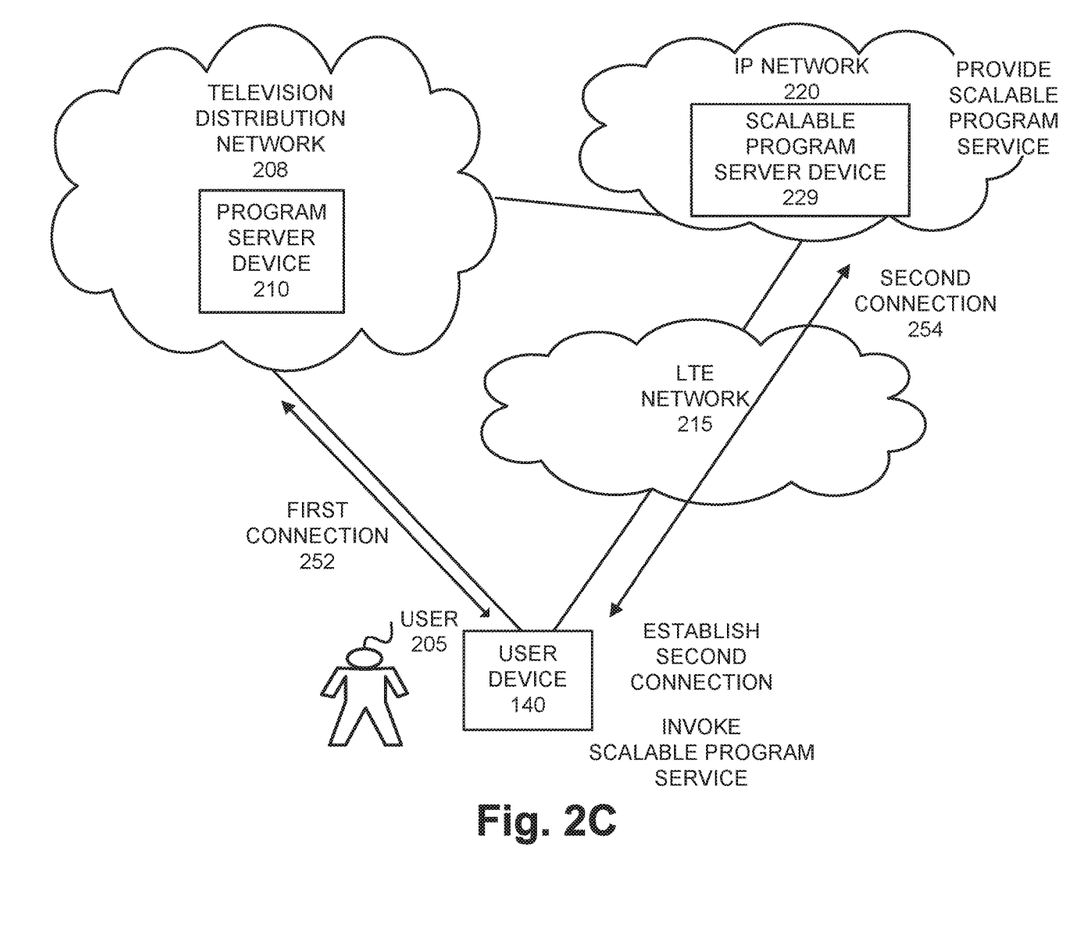

The program support service is described further below in view of exemplary implementations of the embodiments described herein, as illustrated in FIGS. 2A-2C. It may be assumed that user device 140 includes a first network interface card (NIC) and a second NIC to establish first and second connections, respectively, as described below. Additionally, it may be assumed that the agent selects suitable NICs to use to receive the program service and the program support service, as previously described. Referring to FIG. 2A, according to an exemplary scenario illustrative of an exemplary embodiment of the program support service that includes the retransmission service, assume user 205 operates a user device 140 (e.g., a set top box and television) and invokes a program service provided by a program server device 210 via a television distribution network 208. As illustrated, television distribution network 208 includes program server device 210 capable of delivering a program to user device 140. User 205 selects, via an electronic programming guide (EPG), a channel and a program to watch. In response, the agent of user device 140 accesses data that includes channel data (e.g., a virtual channel map) that indicates a channel and/or an address to obtain the selected program. For example, the channel data may include a multicast IP address or a URI of program service device 210 implemented over an Internet Protocol/User Datagram Protocol/Real-time Transport Protocol (IP/UDP/RTP) stack. User device 140 establishes a first connection 252 with program server device 210 via the first NIC. The data also includes retransmission service data that indicates that this channel or this program has the retransmission service. For example, the retransmission service data includes a URI of retransmission server device 225. The retransmission service data may also include data indicating the necessary technologies to use the retransmission service (e.g., wireless interface, protocol stack, port, etc.), message format of the retransmission service, etc. According to an exemplary implementation, the retransmission service uses a Transmission Control Protocol (TCP/IP) stack.

According to this exemplary scenario, assume that the agent of user device 140 determines that it is capable of invoking the retransmission service and chooses (e.g., as a default setting, a user preference, etc.) to invoke the retransmission service via a second network interface card (NIC). The agent uses the retransmission service data to establish a second connection 254 via the second NIC with a retransmission server device 225 of an IP network 220 via an LTE network 215. According to an exemplary implementation, the agent establishes second connection 254 at the onset of receiving the selected program (e.g., before a packet is deemed missing, has an uncorrectable error, etc.). The establishment of second connection 254 may provide a program identifier of the program selected by user 205. According to another exemplary implementation, the agent establishes second connection 254 in response to an identification of a missing/erring packet. The retransmission service may use any conventional or well-known technology to provide the retransmission service.

According to the exemplary scenario, assume, the agent identifies a missing or erring packet. The agent generates a retransmission request message indicating the identified missing or erring packet (e.g., by way of a packet sequence number). The agent transmits the retransmission request message to retransmission server device 225 via second connection 254. Retransmission server device 225 receives the retransmission request message. In response to receiving the retransmission request message, retransmission server device 225 selects the appropriate packet(s), generates a retransmission response message that includes the selected packet(s), and transmits the retransmission response message via second connection 254. The agent receives the retransmission response message via the second NIC and uses the received packet(s) to provide the selected program to user 205.

Referring to FIG. 2B, according to an exemplary scenario illustrative of an exemplary embodiment of the program support service that includes the error correction service. Similar to that previously described in relation to FIG. 2A, assume user 205 operates user device 140 (e.g., a smartphone) and invokes a program service, via a WiFi connection, provided by a program distribution network 255. For example, user 205 selects a program to watch via a program metadata device (not illustrated). In response to user 205's selection, user device 140 is redirected to program server device 210 that provides the selected program and a first connection 252 is established via the first NIC. Additionally, assume that the program selected is supported by the error correction service. According to an exemplary implementation, in response to receiving user 205's selection, program metadata device transmits error correction service data to user device 140. For example, the error correction service data indicates that the selected program is supported by the error correction service. The error correction service data also indicates the necessary technologies to use the error correction service (e.g., wireless interface, protocol stack, port, etc.), the URI of error correction server device 227, etc. According to another exemplary implementation, program server device 210 transmits the error correction service data to user device 140.

According to this exemplary scenario, assume that the agent of user device 140 identifies that it is capable of invoking the error correction service and chooses (e.g., as a default setting, a user preference, etc.) to invoke the error correction service via a second NIC. The agent uses the error correction service data to establish a second connection 254 via the second NIC with an error correction server device 227 of IP network 220 via LTE network 215. The establishment of second connection 254 may include transmitting a program identifier of the program selected by user 205. The error correction service may use any conventional or well-known technology to provide the error correction service.

According to the exemplary scenario, assume program server device 210 transmits program data of the selected program and error correction server device 227 transmits error correction data, which pertains to the selected program. User device 140 receives the program data and the error correction data via first connection 252 and second connection 254. The error correction data allows user device 140 to correct program data received from program server device 210. For example, the agent identifies any errors in the program data and uses the error correction data to correct the identified errors.

Referring to FIG. 2C, according to an exemplary scenario illustrative of an exemplary embodiment of the program support service that includes the scalable program service. Similar to that previously described in relation to FIG. 2A, assume user 205 operates user device 140 (e.g., a tablet device) and invokes a program service, via a WiFi connection, provided by television distribution network 208. For example, user 205 selects a program to watch via a program metadata device (not illustrated). In response to user 205's selection, user device 140 is redirected to program server device 210 and first connection 252 is established via the first NIC. Additionally, assume that the program selected is supported by the scalable program service. For example, the program selected may be scalable video coded (SVC) (e.g., H.263, 264/MPEG-1, 2, 4, spatial scalability, temporal scalability, wavelet-based, etc.). According to an exemplary implementation, in response to receiving user 205's selection, the program metadata device transmits scalable program service data to user device 140. For example, the scalable program service data indicates that the selected program is supported by the scalable program service. The scalable program service data also indicates the necessary technologies to use the scalable program service (e.g., wireless interface, protocol stack, port, etc.), the URI of scalable program server device 229, etc. According to another exemplary implementation, program server device 210 transmits the scalable program service data to user device 140.

According to this exemplary scenario, assume that the agent of user device 140 identifies that it is capable of invoking the scalable program service and chooses (e.g., as a default setting, a user preference, etc.) to invoke the scalable program service. The agent uses the scalable program service data to establish second connection 254 via the second NIC with a scalable program server device 229 of IP network 220 via LTE network 215. The establishment of second connection 254 may include transmitting a program identifier of the program selected by user 205. The scalable program service may use any conventional or well-known technology to provide the scalable program service.

According to the exemplary scenario, assume program service device 210 transmits program data (e.g., a base layer) of the selected program, and scalable program server device 229 transmits scalable program data (e.g., an enhancement layer), which pertains to the selected program. User device 140 receives the program data and the scalable program data simultaneously via first connection 252 and second connection 254. The program data and the scalable program data allows user device 140 to enhance the program data received from program server device 210. For example, user device 140 uses the program data and the scalable program data to present the program to user 205 with a higher video resolution, a higher bit-per-second, etc.

According to the exemplary scenarios described in FIGS. 2A-2C, it was assumed that user device 140 had the capabilities to invoke and use the program support service. However, according to other scenarios, user device 140 may be informed of a program support service, but due to, for example, device capability limitations, user device 140 may be unable to invoke/use the program support service. According to such scenarios, user device 140 may simply ignore the program support service. Additionally, although each of the exemplary scenarios described in FIGS. 2A-2C is directed to a particular program support service, according to other scenarios, the agent of user device 140 may be able to invoke multiple program support services. For example, the agent may invoke/use the error correction service. In response to determining that the error correction service is unable to correct a packet with errors, the agent may invoke/use the retransmission service. Other combinations of the program support service may be invoked and used simultaneously or otherwise. Additionally, when the program service and the program support service are offered by different network devices, the network devices may coordinate any necessary synchronizations, timing, etc., issues that may exist in order to provide a coordination of the program service and the program support service.

Figure 3:
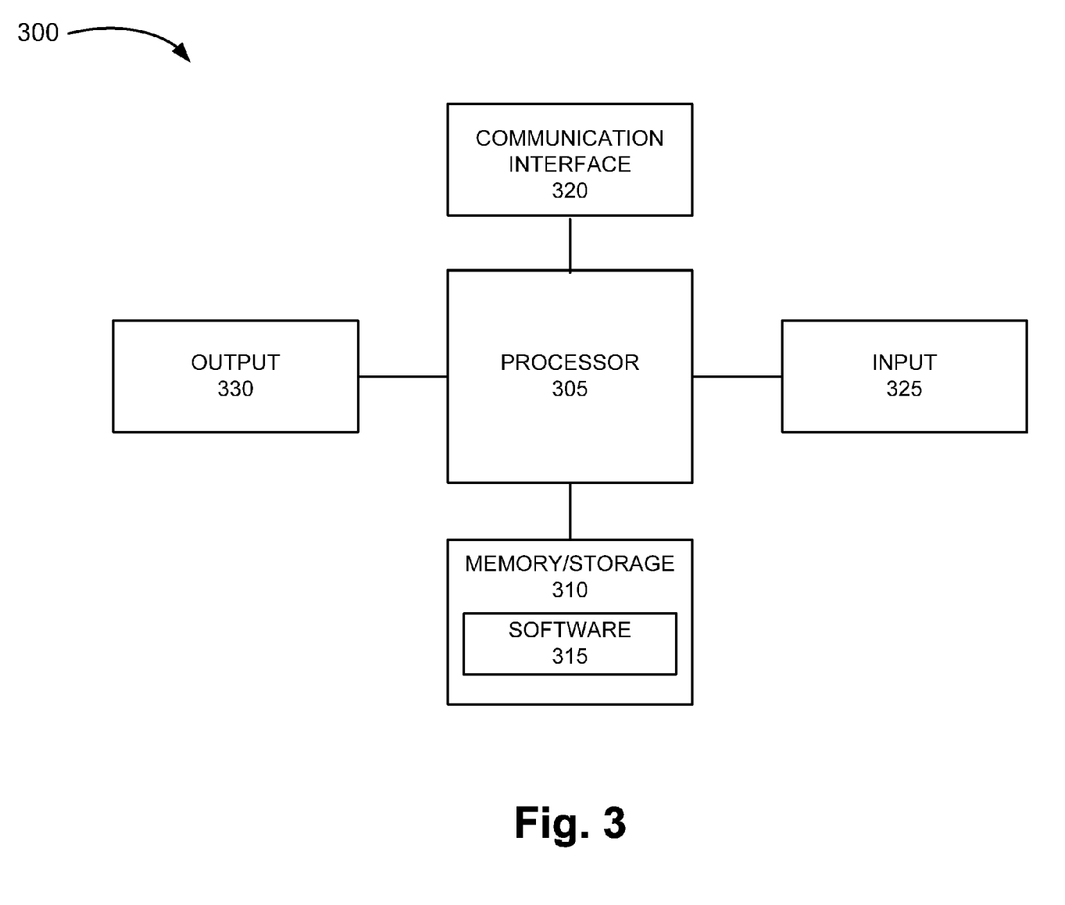
FIG. 3 is a diagram illustrating exemplary components of a device that may correspond to one or more of the devices in the exemplary environment.

FIG. 3 is a diagram illustrating exemplary components of a device 300 that may correspond to one or more of the devices in the environments described herein. For example, device 300 may correspond to program server device 210, retransmission server device 225, user device 140, as well as other network devices described. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to error correction server device 227, software 315 may include an application that, when executed by processor 315, provides the functions as described herein. Additionally, for example, with reference to the agent of user device 140, software 315 may include an application that, when executed by processor 315, provides the functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard. As previously described, according to an exemplary embodiment, user device 140 includes multiple communication interfaces 320. Additionally, as previously described, network device 110 and network device 120 may be implemented as a single network device having multiple communication interfaces 320.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4:
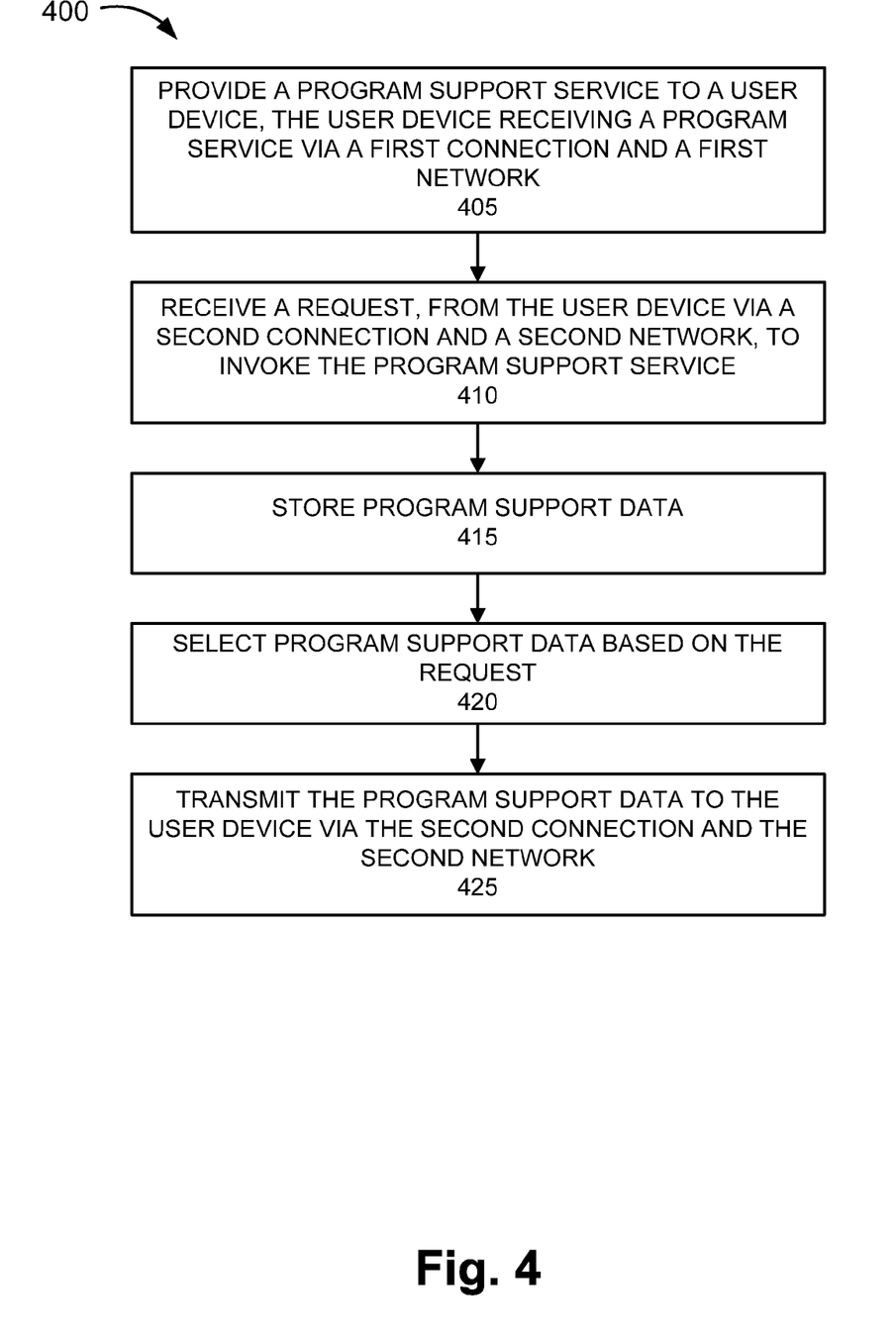
FIG. 4 is a flow diagram that illustrates an exemplary process pertaining to the program support service.

FIG. 4 is a flow diagram illustrating an exemplary process 400 pertaining to the program support service. Process 400 is directed to a process previously described above with respect to FIGS. 2A-2C and elsewhere in this description, in which a program support service device (e.g., retransmission server device 225, error correction server device 227, scalable program server device 229) provides a program support service (e.g., the retransmission service, the error correction service, the scalable program service) via a second connection of a second network. According to an exemplary embodiment, program support service device performs the steps described in process 400. For example, processor 305 may execute software 315 to perform the steps described.

Referring to FIG. 4, process 400 begins by providing a program support service, the user device receiving a program service via a first connection and a first network (block 405). For example, a program support service device (e.g., retransmission server device 225, error correction server device 227, and/or scalable program server device 229) provides a program support service (e.g., the retransmission service, the error correction service, the scalable program service) to user devices 140. As previously described, user devices 140 receives a program service via a first connection and via a first network. User devices 140 access and use the program support service via second connection 254 and second network 115. According to an exemplary embodiment, program support service device may also provide the program service. According to other embodiments, the program support service device may not provide the program service.

In block 410, a request to invoke the program support service is received from a user device via a second connection and a second network. For example, the program support service device receives a request, from an agent of user device 140, to invoke the program support service. The request includes data (e.g., a program identifier) indicating the program to which the program support service pertains. The request may include data indicating the program support service (e.g., the retransmission service, the error correction service, and/or the scalable program service). The request may include other data to allow the program support service to be invoked. For example, when the retransmission service is invoked, the request may include data indicating packet sequence numbers pertaining to missing and/or erring packets received by user device 140.

In block 415, program support data is stored. For example, the program support service device stores program support data (e.g., retransmission data, error correction data, and/or scalable program data). The program support data may be stored in a database.

In block 420, program support data is selected based on the request. For example, program support service device selects the appropriate program support data based on data included in the request. For example, the program support service device may use a program identifier, which identifies the program received by user device 140 from a program device of first network 105, as a key to the database to select the appropriate program support data. Additionally or alternatively, other types of data included in the request may be used to select the appropriate program support data.

In block 425, the program support data is transmitted to the user device via the second connection and the second network. For example, the program support service device transmits the program support data to user device via second connection 254 and second network 115.

Although FIG. 4 illustrates an exemplary program support service process 400, according to other embodiments, process 400 may include additional operations, fewer operations, and/or different operations than those illustrated in FIG. 4 and described herein.

Figure 5A:
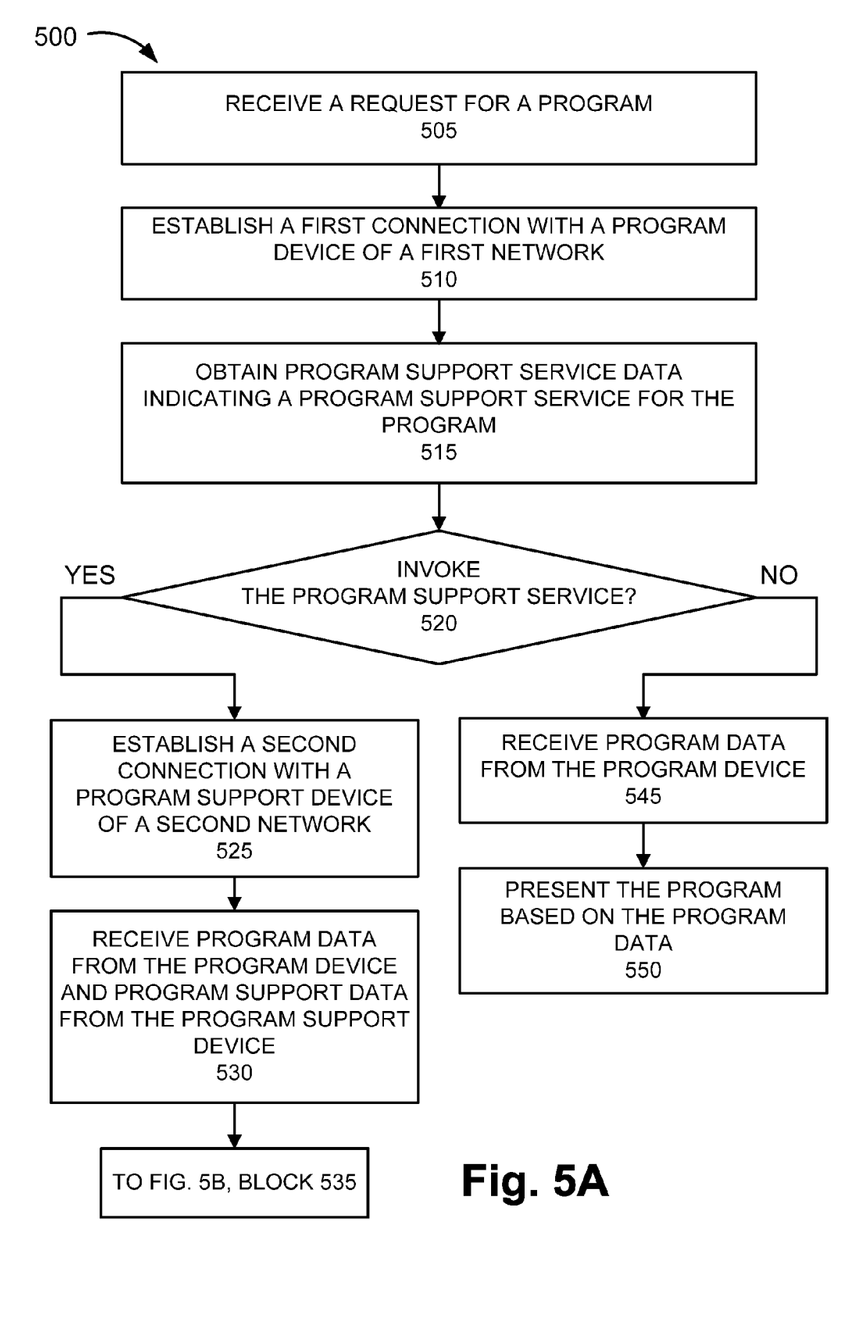
FIGS. 5A and 5B are flow diagrams that illustrate another exemplary process pertaining to the program support service.
Figure 5B:
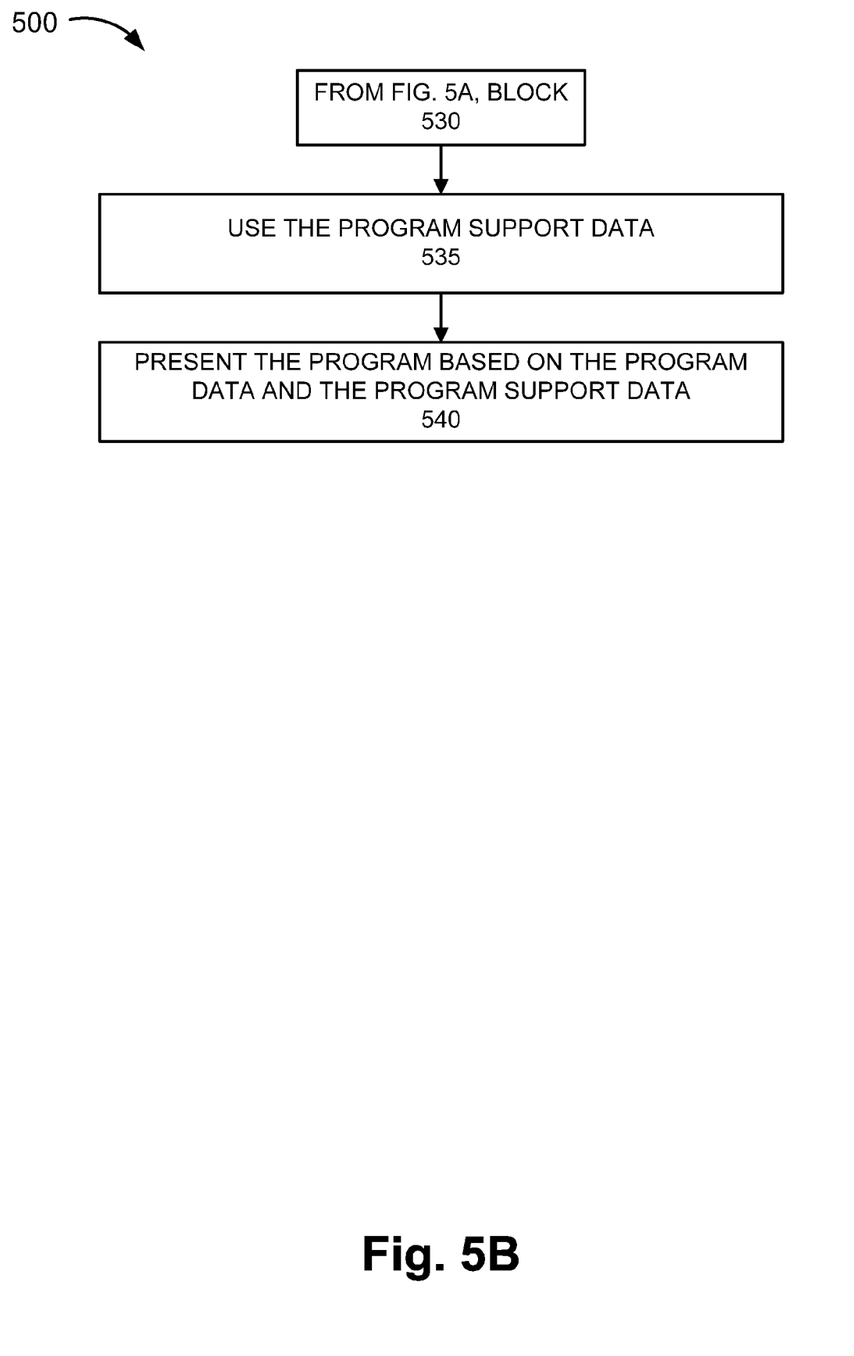

FIGS. 5A and 5B are flow diagrams illustrating another exemplary process 500 pertaining to the program support service. Process 500 is directed to a process previously described above with respect to FIGS. 2A-2C and elsewhere in this description, in which the agent of user device 140 provides a program support service. According to an exemplary embodiment, the agent of user device 140 performs at least some of the steps described in process 500. For example, processor 305 may execute software 315 to perform the steps described.

Process 500 is described with the assumption that the program selected by the user of user device 140 offers at least one of the program support services. Referring to FIG. 5A, process 500 begins by receiving a request for a program. For example, user device 140 is connected to first network 105 that provides a program service. A user selects, via user device 140, a program to watch.

In block 510, a first connection with a program service of a first network is established. For example, user device 140 establishes first connection 252 with a program device via first network 105 to receive the program.

In block 515, program support service data, which indicates a program support service for the program, is obtained. For example, the agent of user device 140 obtains program support service data that indicates the program support service for the selected program. By way of example, network device 110 of first network 105 transmits program support service data (e.g., retransmission service data, error correction service data, and/or scalable program service data) to user device 140 or the program support service data is already stored by user device 140 (e.g., in an EPG, based on an on-boarding process, etc.). The program support service data may indicate other information, such as protocols to use to invoke the service, etc., as previously described.

In block 520, it is determined whether to invoke the program support service. For example, the agent of user device 140 interprets the program support service data and determines whether to invoke the program support service. For example, the agent determines whether user device 140 has the capability (e.g., communication interface, protocol stack, etc.) to invoke the program support service. Additionally, or alternatively, the agent identifies user preference data pertaining to the program support service. For example, the user preference data may indicate to always invoke the program support service, never to invoke the program support service, to invoke the program support service for certain programs, only on a certain channel, etc. Additionally, or alternatively, the agent may use a triggering event to determine whether to invoke the program support service. For example, in the case of the retransmission service, the agent may invoke the retransmission service when missing packets and/or faulty packets are received, or other data is received that indicates a network state (e.g., congestion, etc.) of first network 105 that diminishes quality of service.

If it is determined to invoke the program support service (block 520-YES), a second connection with a program support service of a second network is established (block 525). For example, user device 140 establishes second connection 254 with a program support device via second network 115 based on the program support service data.

In block 530, program data is received from the program device and program support data is received from the program support device. For example, user device 140 receives program data from the program device (e.g., program server device 210). Additionally, user device 140 receives program support data (e.g., retransmission data, error correction data, and/or scalable program data) from the program support device (e.g., retransmission server device 225, error correction server device 227, and/or scalable program server device 229).

Referring to FIG. 5B, in block 535, the program support data is used. For example, user device 140 uses the retransmission service data to provide a retransmission service, uses the error correction data to provide an error correction service, and/or uses the scalable program data to provide a scalable program service.

In block 540, the program is presented based on the program data and the program support data. For example, user device 140 presents (e.g., outputs video and audio, causes to output video and audio) the program.

Referring back to FIG. 5A, if it is determined not to invoke the program support service (block 520-NO), program data is received from the program device (block 545). For example, user device 140 receives program data from the program device (e.g., program server device 210).

In block 550, the program is presented based on the program data. For example, user device 140 presents the program.

Although FIGS. 5A and 5B illustrate an exemplary program support service process 500, according to other embodiments, process 500 may include additional operations, fewer operations, and/or different operations than those illustrated in FIGS. 5A and 5B, and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4, 5A, and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:

establishing, by a user device, a first connection in accordance with a first communicative standard via a first network to a program device that provides a program service;

transmitting, by the user device, a selection of a program offered by the program service, to the program device, in response to the selection of the program from a user of the user device;

obtaining, by the user device, program support service data that includes parameters pertaining to access and use of a program support service for the program selected by the user of the user device, in response to the transmitting, wherein the program support service includes at least one of a retransmission service, an error correction service, or a scalable program service;

determining, by the user device, whether to invoke the program support service based on the program support service data in response to the obtaining;

invoking, by the user device, the program support service via a second connection in accordance with a second communicative standard via a second network and with a program support device that provides the program support service in response to determining to invoke the program support service, wherein the first connection and the second connection include separate physical layer connections;

receiving, by the user device, program data of the program via the first connection and the first network subsequent to the invoking, wherein the program data includes a beginning of the program;

receiving, by the user device, program support data pertaining to the program via the second connection and the second network; and presenting, by the user device, the program based on the program data and the program support data.

2. The method of claim 1, wherein the first connection includes a WiFi connection and the second connection includes a Long Term Evolution connection, and the method further comprising:

determining a capability of a first communication interface of the user device;

determining a capability of a second communication interface of the user device;

determining which of the first communication interface and the second communication interface has a greater capability; and selecting the first communication interface or the second communication interface to establish the first connection in response to determining that the first communication interface or the second communication interface has the greater capability.

3. The method of claim 1, further comprising:

receiving, by the user device, the program data of the program via the first connection and the first network in response to determining not to invoke the program support service.

4. The method of claim 1, wherein the program support service data indicates a uniform resource identifier of the program support device accessible via the second network, and the method further comprising:

establishing the second connection with the program support device based on the uniform resource identifier.

5. The method of claim 1, further comprising:
storing user preference data pertaining to the program support service, and wherein the determining comprises:
determining whether to invoke the program support service based on the user preference data.
6. The method of claim 1, further comprising:
determining that congestion exists in the first network, and wherein the invoking comprises:
invoking the program support service based on a determination that the congestion exists in the first network.
7. The method of claim 1, wherein the parameters of the program support service data include user device requirements to invoke the program support service, and wherein the determining comprises:
determining, by the user device, whether the user device satisfies the user device requirements, wherein the user device requirements include a type of communication interface, a protocol stack, and a port.
8. The method of claim 1, wherein the program support service is offered on a per television channel, a per stream, or a per program basis.
9. A user device comprising:
a first communication interface of a first communicative standard;
a second communication interface of a second communicative standard, wherein the first communicative standard is different from the second communicative standard;
a memory, wherein the memory stores instructions; and
a processor, wherein the processor executes the instructions to:
establish, via the first communication interface, a first connection via a first network to a first network device that provides a program service;
transmit, via the first communication interface, a selection of a program offered by the program service, to the first network device, in response to the selection of the program from a user of the user device;
obtain program support service data that includes parameters pertaining to access and use of a program support service for the program selected by the user of the user device in response to the transmission of the selection of the program, wherein the program support service includes at least one of a retransmission service, an error correction service, or a scalable program service;
determine whether to invoke the program support service based on the program support service data in response to the obtainment of the program support service data;
establish, via the second communication interface, a second connection via a second network to a second network device that provides the program support service in response to a determination to invoke the program support service, wherein the first connection and the second connection include separate physical layer connections;
invoke, via the second communication interface, the program support service via the second connection;
receive, via the first communication interface, program data of the program via the first connection subsequent to an invocation of the program support service, wherein the program data includes a beginning of the program;
receive, via the second communication interface, program support data pertaining to the program via the second connection; and
present or cause to present the program based on the program data and the program support data.
10. The user device of claim 9, wherein the processor further executes the instructions to:
receive, via the first communication interface, program data of the program via the first connection in response to a determination not to invoke the program support service; and
present or cause to present the program based on the program data.
11. The user device of claim 9, wherein the processor further executes the instructions to:
store user preference data pertaining to the program support service, and wherein, when determining whether to invoke the program support service, the processor further executes the instructions to:
determine whether to invoke the program support service based on the user preference data.
12. The user device of claim 9, wherein the processor further executes the instructions to:
determine that congestion exists in the first network, and wherein, when invoking the program support service, the processor further executes the instructions to:
invoke the program support service based on a determination that the congestion exists in the first network.
13. The user device of claim 9, wherein the first connection includes a WiFi connection and the second connection includes a Long Term Evolution connection, and wherein the user device comprises a mobile device.
14. The user device of claim 9, wherein, when obtaining the program support service data, the processor further executes the instructions to:
store electronic programming guide data that includes the program support service data; and
select the program support service data pertaining to the program selected by the user via an electronic programming guide.
15. The user device of claim 9, wherein, when invoking the program support service, the processor further executes the instructions to:
generate a request that includes a program identifier pertaining to the program selected and data indicating at least one of the retransmission service, the error correction service, or the scalable program service; and
transmit, via the second communication interface, the request.
16. A non-transitory storage medium storing instructions executable by a processor of a computational device to:
establish, via a first communication interface of the computational device, a first connection via a first network to a first network device that provides a program service;
transmit, via the first communication interface of the computational device, a selection of a program offered by the program service, to the first network device, in response to the selection of the program from a user of the computational device;
obtain program support service data that includes parameters pertaining to access and use of a program support service for the program selected by the user of the computational device in response to the transmission of the selection of the program, wherein the program support service includes at least one of a retransmission service, an error correction service, or a scalable program service;

determine whether to invoke the program support service based on the program support service data in response to the obtainment of the program support service data;

establish, via a second communication interface of the computational device, a second connection via a second network to a second network device that provides the program support service in response to a determination to invoke the program support service, wherein the first connection and the second connection include separate physical layer connections;

invoke the program support service via the second connection;

receive program data of the program via the first connection subsequent to an invocation of the program support service, wherein the program data includes a beginning of the program;

receive program support data pertaining to the program via the second connection; and present or cause to present the program based on the program data and the program support data.

17. The non-transitory storage medium of claim 16, further storing instructions executable by the processor of the computational device to:

receive the program data of the program via the first connection in response to a determination not to invoke the program support service; and present or cause to present the program based on the program data.

18. The non-transitory storage medium of claim 16, further storing instructions executable by the processor of the computational device to:

determine that congestion exists in the first network; and invoke the program support service based on a determination that the congestion exists in the first network.

19. The non-transitory storage medium of claim 16, wherein the instructions to obtain the program support service data comprise instructions to:

store electronic programming guide data that includes the program support service data; and select the program support service data pertaining to the program selected by the user via an electronic programming guide.

20. The non-transitory storage medium of claim 16, wherein the program support service data includes a uniform resource identifier of the second network device, wherein the instructions to invoke the program support service comprise instructions to:

generate a request that includes a program identifier pertaining to the program selected, data indicating at least one of the retransmission service, the error correction service, or the scalable program service, and the uniform resource identifier; and transmit the request via the second connection to the second network device.

* * * * *